United States Patent
Huang et al.

(10) Patent No.: US 12,413,364 B2
(45) Date of Patent: Sep. 9, 2025

(54) USER EQUIPMENT BEHAVIOR AND REQUIREMENTS FOR POSITIONING MEASUREMENT WITHOUT GAP

(71) Applicant: Intel Corporation, Santa Clara, CA (US)

(72) Inventors: Rui Huang, Beijing (CN); Meng Zhang, Beijing (CN); Andrey Chervyakov, Maynooth (IE); Hua Li, Beijing (CN); Ilya Bolotin, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 18/094,169

(22) Filed: Jan. 6, 2023

(65) Prior Publication Data

US 2023/0155781 A1    May 18, 2023

Related U.S. Application Data

(60) Provisional application No. 63/297,646, filed on Jan. 7, 2022.

(51) Int. Cl.
*H04L 5/00* (2006.01)
*H04W 24/10* (2009.01)
*H04W 64/00* (2009.01)

(52) U.S. Cl.
CPC .......... *H04L 5/0051* (2013.01); *H04W 24/10* (2013.01); *H04W 64/00* (2013.01)

(58) Field of Classification Search
CPC ...... H04L 5/0051; H04W 24/10; H04W 64/00
See application file for complete search history.

(56) References Cited

U.S. PATENT DOCUMENTS

| | | | |
|---|---|---|---|
| 2014/0094188 A1* | 4/2014 | Kazmi | H04W 4/023 455/456.1 |
| 2021/0360578 A1* | 11/2021 | Manolakos | H04W 24/10 |

OTHER PUBLICATIONS

3GPP, "Technical Specification Group Radio Access Network; LTE Positioning Protocol (LPP) (Release 16)," 3GPP TS 37.355 V16.7.0 (Dec. 2021), 5G, 299 pages.
3GPP, "Technical Specification Group Radio Access Network; NR; Requirements for support of radio resource management (Release 17)," 3GPP TS 38.133 V17.3.0 (Sep. 2021), pp. 382-385.
3GPP, "Technical Specification Group Radio Access Network; NR; Physical layer procedures for data (Release 17)," 3GPP TS 38.214 V17.0.0 (Dec. 2021), 5G, 217 pages.
RAN1, "LS on PRS measurement outside the measurement gap," 3GPP TSG RAN WG1 #106-e, R1-2108639, Release: Rel-17, Aug. 16-27, 2021, e-Meeting, 2 pages.

* cited by examiner

*Primary Examiner* — Natasha W Cosme
(74) *Attorney, Agent, or Firm* — Schwegman Lundberg & Woessner, P.A.

(57) ABSTRACT

Various embodiments herein provide techniques for positioning measurements in a wireless cellular network without a measurement gap. The measurements may be performed in one or more positioning frequency layers (PFLs). Additionally, techniques for activation and/or deactivation of a measurement gap are provided. Other embodiments may be described and claimed.

20 Claims, 5 Drawing Sheets

---

400 identifying a positioning reference signal (PRS) measurement period based on a timing interval of:

$$T_{\text{effect},i} = \left\lceil \frac{T_i}{T_{PRS,i}} \right\rceil * T_{PRS,i}$$

wherein i is a positioning frequency layer index, $T_{\text{effect},i}$ is a periodicity of an effective PRS measurement in a positioning frequency layer i, $T_i$ corresponds to a duration of PRS processing symbols in every T milliseconds, and $T_{PRS,i}$ is a periodicity of a downlink PRS resource with muting on positioning frequency layer i
402

↓ performing one or more PRS measurements within the PRS measurement period
404

400 identifying a positioning reference signal (PRS) measurement period based on a timing interval of:

$$T_{effect,i} = \left\lceil \frac{T_i}{T_{PRS,i}} \right\rceil * T_{PRS,i}$$

wherein i is a positioning frequency layer index, $T_{effect,i}$ is a periodicity of an effective PRS measurement in a positioning frequency layer i, $T_i$ corresponds to a duration of PRS processing symbols in every T milliseconds, and $T_{PRS,i}$ is a periodicity of a downlink PRS resource with muting on positioning frequency layer i
402 performing one or more PRS measurements within the PRS measurement period
404

Figure 4

500 encoding, for transmission to a user equipment (UE), an indication of a periodicity of a downlink positioning reference signal (PRS) resource on a positioning frequency layer i, wherein a PRS measurement period is based on a timing interval of $$T_{effect,i} = \left\lceil \frac{T_i}{T_{PRS,i}} \right\rceil * T_{PRS,i}$$

wherein $T_{effect,i}$ is a periodicity of an effective PRS measurement in a positioning frequency layer i, $T_i$ corresponds to a duration of PRS processing symbols in every T milliseconds, and $T_{PRS,i}$ is the periodicity of the downlink PRS resource on the positioning frequency layer i
502 receiving, from the UE, one or more PRS measurements in accordance with the PRS measurement period
504

Figure 5

USER EQUIPMENT BEHAVIOR AND REQUIREMENTS FOR POSITIONING MEASUREMENT WITHOUT GAP

CROSS REFERENCE TO RELATED APPLICATION

The present application claims priority to U.S. Provisional Patent Application No. 63/297,646, which was filed Jan. 7, 2022; the disclosure of which is hereby incorporated by reference.

FIELD

Various embodiments generally may relate to the field of wireless communications. For example, some embodiments may relate to user equipment (UE) behavior and requirements for positioning measurements without a gap.

BACKGROUND

A user equipment (UE) in a wireless cellular network typically receives positioning reference signals (PRSs) from one or more next generation Node Bs (gNBs). The UE performs positioning measurements on the PRSs, such as a received signal time difference (RSTD) measurement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4 illustrates an example process for practicing the various embodiments herein.

FIG. 5 illustrates another example process for practicing the various embodiments herein.

DETAILED DESCRIPTION

Figure 1:
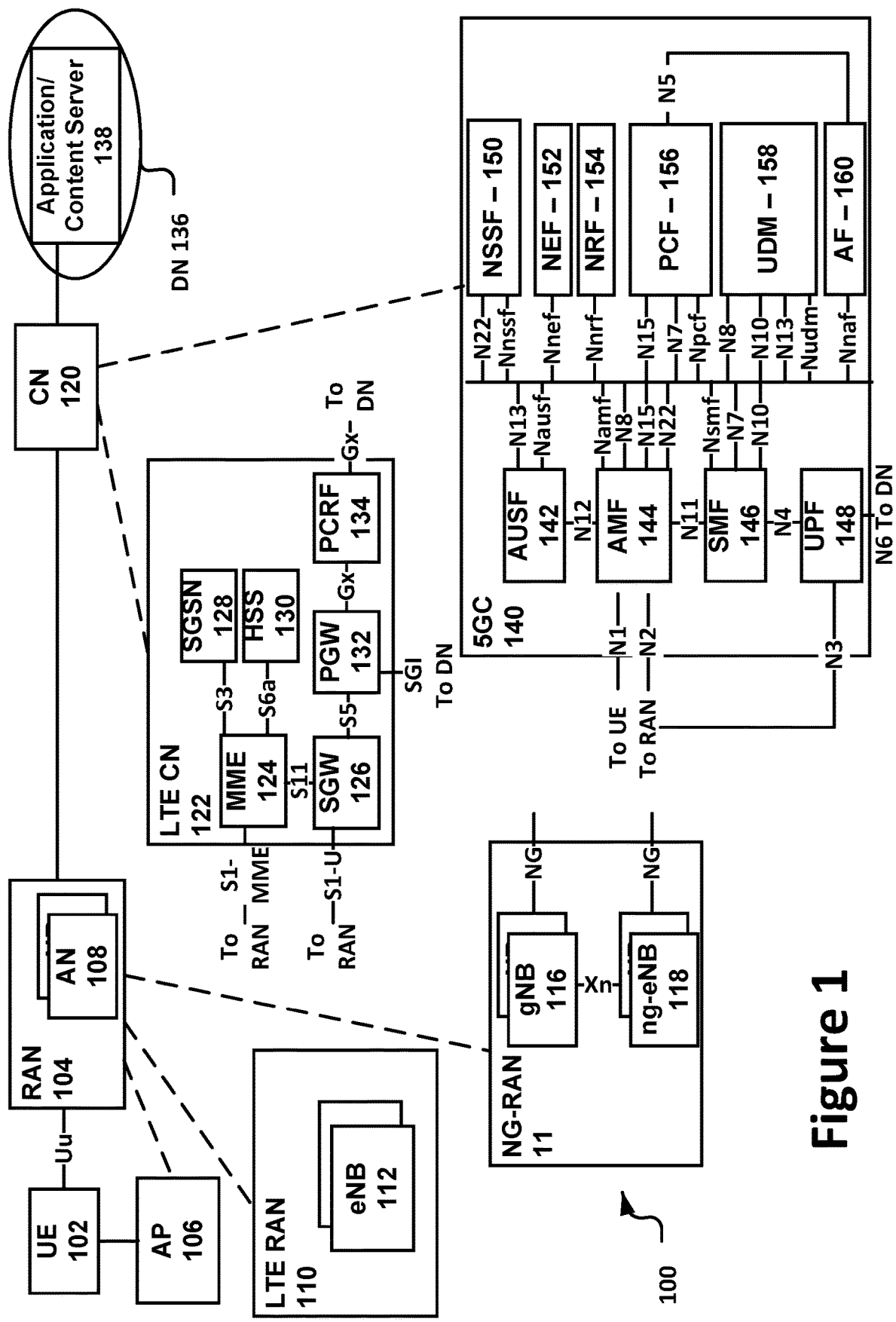
FIG. 1 schematically illustrates a wireless network in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for the UE to perform positioning measurements (e.g., on a positioning reference signal (PRS)) in a wireless cellular network. For example, embodiments may relate to the UE reporting the timing error group (TEG) information for NR positioning.

With respect to the reporting requirements for the PRS measurement requirements in Rel16 [TS38.133] below, the delay requirement of DL PRS RSTD will depend on number of crucial factors which will be addressed below: the number of positioning occasions and the number of consecutive subframes, periodicity of positioning occasions, measurement sampling rate, measurement bandwidth, beam management, and other network assistance information, etc.

$$T_{RSTD,Total} = \sum_{i=1}^{L} T_{RSTD,i} + (L-1) * \max(T_{effect,i})$$

Where, i is the index of positioning frequency layer,

L is total number of positioning frequency layers, and $T_{effect,i}$ is the periodicity of the PRS RSTD measurement in positioning frequency layer i $T_{RSTD,i}$ is the measurement period for PRS RSTD measurement in positioning frequency layer i as specified below:

$T_{RSTD,i} =$ $$\left( CSSF_{PRS,i} * N_{RxBeam,i} * \left\lceil \frac{N_{PRS,i}^{slot}}{N'} \right\rceil \left\lceil \frac{L_{available\_PRS,i}}{N} \right\rceil * N_{sample} - 1 \right) * T_{effect,i} + T_{last},$$

where:

$N_{RxBeam,i}$ is the UE Rx beam sweeping factor. In FR1, $N_{RxBeam,i}=1$; and in FR2, $N_{RxBeam,i}=8$.

$CSSF_{PRS,i}$ is the carrier-specific scaling factor for NR PRS-based positioning measurements in positioning frequency layer i as defined in clause 9.1.5.2.

$N_{PRS}^{slot}$ is the maximum number of DL PRS resources in positioning frequency layer i configured in a slot.

$L_{available\_PRS,i}$ is the time duration of available PRS to be measured in the positioning frequency layer i, and is calculated in the same way as PRS duration K defined in clause 5.1.6.5 of TS 38.214 [26].

$N_{sample}$ is the number of PRS RSTD samples and $N_{sample}=4$.

$T_{last}$ is the measurement duration for the last PRS RSTD sample, including the sampling time and processing time, $T_{last}=T_i+T_{available\_PRS,i}$, $T_{effect,i}$ is the periodicity of the PRS RSTD measurement in positioning frequency layer i defined as:

$$T_{effect,i} = \left\lceil \frac{T_i}{T_{available\_PRS,i}} \right\rceil * T_{available\_PRS,i}$$

Where, $T_i$ corresponds to durationOfPRS-ProcessingSymbolsInEveryTms in TS 37.355 [34], $T_{available\_PRS,i}$=LCM($T_{PRS,i}$, $MGRP_i$), the least common multiple between $T_{PRS,i}$ and $MGRP_i$.

$MGRP_i$ is the repetition periodicity of the measurement gap applicable for measurement in the PRS frequency layer i.

$T_{PRS,i}$ is the periodicity of DL PRS resource with muting on positioning frequency layer i.

If more than one PRS periodicities are configured in positioning frequency layer i, the least common multiple of PRS periodicities T PRS with muting among all DL PRS resource sets in the positioning frequency layer is used to derive the measurement period of that positioning frequency layer i. Where, $T_{per}^{PRS\ with\ muting}=N_{muting}*T_{per}^{PRS}$ is the PRS periodicity with muting per PRS resource, $T_{per}^{PRS}$ is the periodicity of PRS resource sets given by the higher-layer parameter DL-PRS-Periodicity.

$N_{muting}$ is the scaling factor considering PRS resource muting. If bitmap {$b^1$} for higher-layer parameter DL-PRS-MutingPattern is provided, and $T_{per}^{PRS}*T_{muting}^{PRS} \leq 10240$ ms, then $$N_{muting} = T_{muting}^{PRS} * \min\left(L, \frac{10240}{T_{per}^{PRS} * T_{muting}^{PRS}}\right);$$

otherwise, if bitmap {$b^1$} is not provided or $T_{per}^{PRS}*T_{muting}^{PRS}>10240$ ms, then $N_{muting}=1$.

$T_{muting}^{PRS}$ is the muting repetition factor given by the higher-layer parameter DL-PRS-MutingBitRepetitionFactor, and L is the size of the bitmap {$b^1$}.

Note: For the purpose of calculating TPRS,i, only the PRS resources fully or partially covered by the MG are considered.

{N, T} is UE capability combination per band where N is a duration of DL PRS symbols in ms corresponding to durationOfPRS-ProcessingSysmbols in TS 37.355 [34] processed every T ms corresponding to durationOfPRS-ProcessingSymbolsInEveryTms in TS 37.355 [34] for a given maximum bandwidth supported by UE corresponding to supportedBandwidthPRS in TS 37.355 [34].

N' is UE capability for number of DL PRS resources that it can process in a slot as indicated by maxNumOfDL-PRS-ResProcessedPerSlot specified in TS 37.355 [34].

The time $T_{RSTD,i}$ starts from the first MG instance aligned with a DL PRS resource(s) of positioning frequency layer i closest in time after both the NR-TDOA-ProvideAssistanceData message and NR-TDOA-RequestLocationInformation message are delivered from LMF to the physical layer of UE via LPP [34].

Periodicity of PRS Occasion

For the gap-less measurement, the periodicity of PRS occasion ($T_{available\_PRS,i}$) can be same as the configured PRS periodicity ($T_{PRS,i}$) by LMF because no MGRP.

The network configured $T_{PRS}$ is broadcasted to all UEs in a cell. Thus, according to RAN1 agreements on how to define UE processing capability ("T"), it is possible that there is misalignment between the network configured $T_{PRS}$ and UE specific T. As a result, from RAN4 perspective, the measurement delay requirements may depend on the larger interval of available PRSs. Thus max(T, $T_{PRS}$) may be taken as the basic timing interval for PRS measurement latency requirements.

In some embodiments, the basic timing interval to be used to define PRS measurement period may be:

$$T_{effect,i} = \left\lceil \frac{T_i}{T_{PRS,i}} \right\rceil * T_{PRS,i}$$

Applicable Number of Positioning Frequency Layers (PFLs)

In some embodiments, in case of the gap-less PRS measurement, there is only single PFL to be measurement. Otherwise, the gap may be needed. But it is also feasible for the UE which can support the gap less measurement for different PFLs (e.g. the center frequency of different PFLs are same but the active BWP of them not.

Accordingly, in some embodiments, the PRS gap-less measurement requirements is applicable for the single PFL only.

In other embodiments, when the multiple PFLs configured, UE can decide perform the intra-f measurement for the PFL which can contained within UE's active bandwidth part (BWP). The UE may perform measurements on other PFLs by inter-frequency measurement.

PRS Processing Window

Ti can impact the Teffect time above.

Carrier Specific Scaling Factor (CSSF)

If the gap-less PRS measurement used, the other concurrent PRS processing and the legacy RRM measurements can be possible. The existing CSSF may be updated accordingly.

Measurement Gap (MG) Activation and Deactivation Mechanisms

In RAN1, the possible measurement gap enhancement in RAN1 were discussed. Up to now, some agreements/working assumptions in RAN1 was achieved [R1-2108639]:

Subject to UE capability, support PRS measurement outside the MG, within a PRS processing window, and UE.

As the pre-configured MG for PRS was introduced in Rel17, the corresponding requirements for this new aspect may be introduced. For example, in some embodiments, requirements may be defined for the case with MG switch, e.g. by taking into account the new MG.

Systems and Implementations

Figure 2:
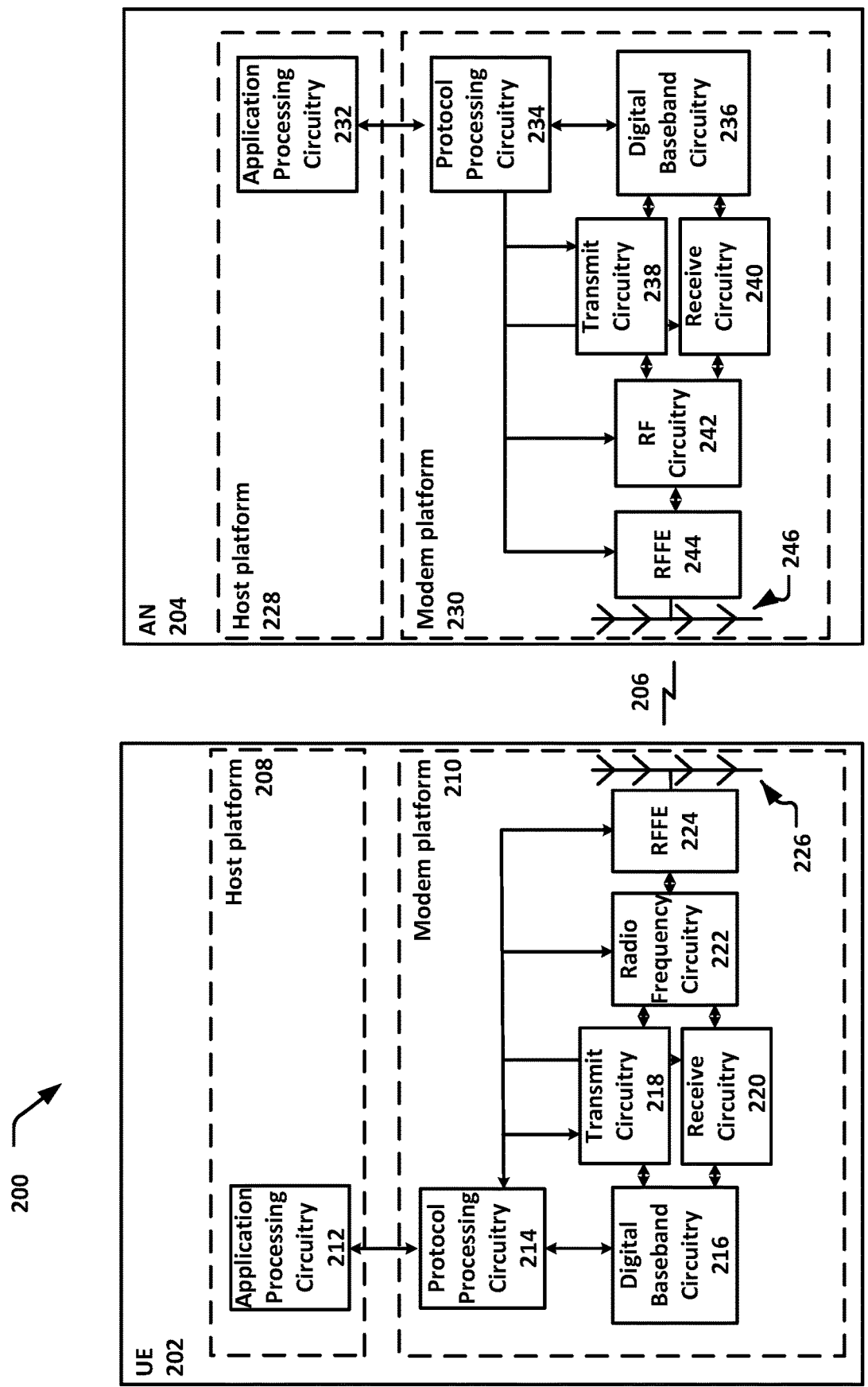
FIG. 2 schematically illustrates components of a wireless network in accordance with various embodiments.
Figure 3:
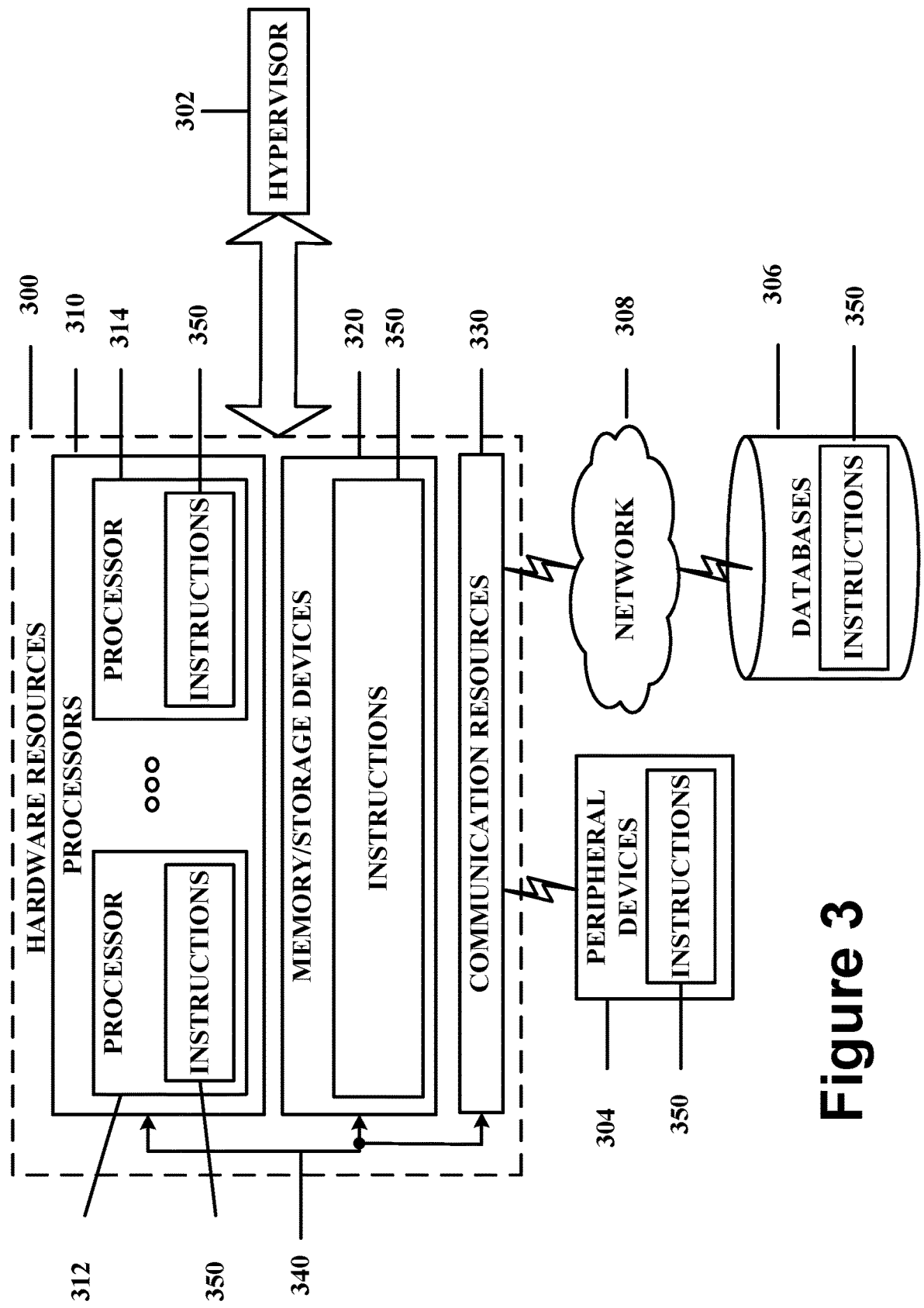
FIG. 3 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 1-3 illustrate various systems, devices, and components that may implement aspects of disclosed embodiments.

FIG. 1 illustrates a network 100 in accordance with various embodiments. The network 100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 100 may include a UE 102, which may include any mobile or non-mobile computing device designed to communicate with a RAN 104 via an over-the-air connection. The UE 102 may be communicatively coupled with the RAN 104 by a Uu interface. The UE 102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 100 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 102 may additionally communicate with an AP 106 via an over-the-air connection. The AP 106 may manage a WLAN connection, which may serve to offload some/all network traffic from the RAN 104. The connection between the UE 102 and the AP 106 may be consistent with any IEEE 802.11 protocol, wherein the AP 106 could be a wireless fidelity (Wi-Fi®) router. In some embodiments, the UE 102, RAN 104, and AP 106 may utilize cellular-WLAN aggregation (for example, LWA/LWIP). Cellular-WLAN aggregation may involve the UE 102 being configured by the RAN 104 to utilize both cellular radio resources and WLAN resources.

The RAN 104 may include one or more access nodes, for example, AN 108. AN 108 may terminate air-interface protocols for the UE 102 by providing access stratum protocols including RRC, PDCP, RLC, MAC, and L1 protocols. In this manner, the AN 108 may enable data/voice connectivity between CN 120 and the UE 102. In some embodiments, the AN 108 may be implemented in a discrete device or as one or more software entities running on server computers as part of, for example, a virtual network, which may be referred to as a CRAN or virtual baseband unit pool. The AN 108 be referred to as a BS, gNB, RAN node, eNB, ng-eNB, NodeB, RSU, TRxP, TRP, etc. The AN 108 may be a macrocell base station or a low power base station for providing femtocells, picocells or other like cells having smaller coverage areas, smaller user capacity, or higher bandwidth compared to macrocells.

In embodiments in which the RAN 104 includes a plurality of ANs, they may be coupled with one another via an X2 interface (if the RAN 104 is an LTE RAN) or an Xn interface (if the RAN 104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs of the RAN 104. For example, the UE 102 and RAN 104 may use carrier aggregation to allow the UE 102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 102 or AN 108 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 104 may be an LTE RAN 110 with eNBs, for example, eNB 112. The LTE RAN 110 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 104 may be an NG-RAN 114 with gNBs, for example, gNB 116, or ng-eNBs, for example, ng-eNB 118. The gNB 116 may connect with 5G-enabled UEs using a 5G NR interface. The gNB 116 may connect with a 5G core through an NG interface, which may include an N2 interface or an N3 interface. The ng-eNB 118 may also connect with the 5G core through an NG interface, but may connect with a UE via an LTE air interface. The gNB 116 and the ng-eNB 118 may connect with each other over an Xn interface.

In some embodiments, the NG interface may be split into two parts, an NG user plane (NG-U) interface, which carries traffic data between the nodes of the NG-RAN 114 and a UPF 148 (e.g., N3 interface), and an NG control plane (NG-C) interface, which is a signaling interface between the nodes of the NG-RAN 114 and an AMF 144 (e.g., N2 interface).

The NG-RAN 114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (for example, PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

The RAN 104 is communicatively coupled to CN 120 that includes network elements to provide various functions to support data and telecommunications services to customers/subscribers (for example, users of UE 102). The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

In some embodiments, the CN 120 may be an LTE CN 122, which may also be referred to as an EPC. The LTE CN 122 may include MME 124, SGW 126, SGSN 128, HSS 130, PGW 132, and PCRF 134 coupled with one another over interfaces (or "reference points") as shown. Functions of the elements of the LTE CN 122 may be briefly introduced as follows.

The MME 124 may implement mobility management functions to track a current location of the UE 102 to facilitate paging, bearer activation/deactivation, handovers, gateway selection, authentication, etc.

The SGW 126 may terminate an S1 interface toward the RAN and route data packets between the RAN and the LTE CN 122. The SGW 126 may be a local mobility anchor point for inter-RAN node handovers and also may provide an anchor for inter-3GPP mobility. Other responsibilities may include lawful intercept, charging, and some policy enforcement.

The SGSN 128 may track a location of the UE 102 and perform security functions and access control. In addition, the SGSN 128 may perform inter-EPC node signaling for mobility between different RAT networks; PDN and S-GW selection as specified by MME 124; MME selection for handovers; etc. The S3 reference point between the MME 124 and the SGSN 128 may enable user and bearer information exchange for inter-3GPP access network mobility in idle/active states.

The HSS 130 may include a database for network users, including subscription-related information to support the network entities' handling of communication sessions. The HSS 130 can provide support for routing/roaming, authentication, authorization, naming/addressing resolution, location dependencies, etc. An S6a reference point between the HSS 130 and the MME 124 may enable transfer of subscription and authentication data for authenticating/authorizing user access to the LTE CN 120.

The PGW 132 may terminate an SGi interface toward a data network (DN) 136 that may include an application/content server 138. The PGW 132 may route data packets between the LTE CN 122 and the data network 136. The PGW 132 may be coupled with the SGW 126 by an S5 reference point to facilitate user plane tunneling and tunnel management. The PGW 132 may further include a node for policy enforcement and charging data collection (for example, PCEF). Additionally, the SGi reference point between the PGW 132 and the data network 1 36 may be an operator external public, a private PDN, or an intra-operator packet data network, for example, for provision of IMS services. The PGW 132 may be coupled with a PCRF 134 via a Gx reference point.

The PCRF 134 is the policy and charging control element of the LTE CN 122. The PCRF 134 may be communicatively coupled to the app/content server 138 to determine appropriate QoS and charging parameters for service flows. The PCRF 132 may provision associated rules into a PCEF (via Gx reference point) with appropriate TFT and QCI.

In some embodiments, the CN 120 may be a 5GC 140. The 5GC 140 may include an AUSF 142, AMF 144, SMF 146, UPF 148, NSSF 150, NEF 152, NRF 154, PCF 156, UDM 158, and AF 160 coupled with one another over interfaces (or "reference points") as shown. Functions of the elements of the 5GC 140 may be briefly introduced as follows.

The AUSF 142 may store data for authentication of UE 102 and handle authentication-related functionality. The AUSF 142 may facilitate a common authentication framework for various access types. In addition to communicating with other elements of the 5GC 140 over reference points as shown, the AUSF 142 may exhibit an Nausf service-based interface.

The AMF 144 may allow other functions of the 5GC 140 to communicate with the UE 102 and the RAN 104 and to subscribe to notifications about mobility events with respect to the UE 102. The AMF 144 may be responsible for registration management (for example, for registering UE 102), connection management, reachability management, mobility management, lawful interception of AMF-related events, and access authentication and authorization. The AMF 144 may provide transport for SM messages between the UE 102 and the SMF 146, and act as a transparent proxy for routing SM messages. AMF 144 may also provide transport for SMS messages between UE 102 and an SMSF. AMF 144 may interact with the AUSF 142 and the UE 102 to perform various security anchor and context management functions. Furthermore, AMF 144 may be a termination point of a RAN CP interface, which may include or be an N2 reference point between the RAN 104 and the AMF 144; and the AMF 144 may be a termination point of NAS (N1) signaling, and perform NAS ciphering and integrity protection. AMF 144 may also support NAS signaling with the UE 102 over an N3 IWF interface.

The SMF 146 may be responsible for SM (for example, session establishment, tunnel management between UPF 148 and AN 108); UE IP address allocation and management (including optional authorization); selection and control of UP function; configuring traffic steering at UPF 148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 144 over N2 to AN 108; and determining SSC mode of a session. SM may refer to management of a PDU session, and a PDU session or "session" may refer to a PDU connectivity service that provides or enables the exchange of PDUs between the UE 102 and the data network 136.

The UPF 148 may act as an anchor point for intra-RAT and inter-RAT mobility, an external PDU session point of interconnect to data network 136, and a branching point to support multi-homed PDU session. The UPF 148 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 148 may include an uplink classifier to support routing traffic flows to a data network.

The NSSF 150 may select a set of network slice instances serving the UE 102. The NSSF 150 may also determine allowed NSSAI and the mapping to the subscribed S-NS-SAIs, if needed. The NSSF 150 may also determine the AMF set to be used to serve the UE 102, or a list of candidate AMFs based on a suitable configuration and possibly by querying the NRF 154. The selection of a set of network slice instances for the UE 102 may be triggered by the AMF 144 with which the UE 102 is registered by interacting with the NSSF 150, which may lead to a change of AMF. The NSSF 150 may interact with the AMF 144 via an N22 reference point; and may communicate with another NSSF in a visited network via an N31 reference point (not shown). Additionally, the NSSF 150 may exhibit an Nnssf service-based interface.

The NEF 152 may securely expose services and capabilities provided by 3GPP network functions for third party, internal exposure/re-exposure, AFs (e.g., AF 160), edge computing or fog computing systems, etc. In such embodiments, the NEF 152 may authenticate, authorize, or throttle the AFs. NEF 152 may also translate information exchanged with the AF 160 and information exchanged with internal network functions. For example, the NEF 152 may translate between an AF-Service-Identifier and an internal 5GC information. NEF 152 may also receive information from other NFs based on exposed capabilities of other NFs. This information may be stored at the NEF 152 as structured data, or at a data storage NF using standardized interfaces. The stored information can then be re-exposed by the NEF 152 to other NFs and AFs, or used for other purposes such as analytics. Additionally, the NEF 152 may exhibit an Nnef service-based interface.

The NRF 154 may support service discovery functions, receive NF discovery requests from NF instances, and provide the information of the discovered NF instances to the NF instances. NRF 154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 154 may exhibit the Nnrf service-based interface.

The PCF 156 may provide policy rules to control plane functions to enforce them, and may also support unified policy framework to govern network behavior. The PCF 156 may also implement a front end to access subscription information relevant for policy decisions in a UDR of the UDM 158. In addition to communicating with functions over reference points as shown, the PCF 156 exhibit an Npcf service-based interface.

The UDM 158 may handle subscription-related information to support the network entities' handling of communication sessions, and may store subscription data of UE 102. For example, subscription data may be communicated via an N8 reference point between the UDM 158 and the AMF 144. The UDM 158 may include two parts, an application front end and a UDR. The UDR may store subscription data and policy data for the UDM 158 and the PCF 156, and/or structured data for exposure and application data (including PFDs for application detection, application request information for multiple UEs 102) for the NEF 152. The Nudr service-based interface may be exhibited by the UDR 221 to allow the UDM 158, PCF 156, and NEF 152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 158 may exhibit the Nudm service-based interface.

The AF 160 may provide application influence on traffic routing, provide access to NEF, and interact with the policy framework for policy control.

In some embodiments, the 5GC 140 may enable edge computing by selecting operator/3rd party services to be geographically close to a point that the UE 102 is attached to the network. This may reduce latency and load on the network. To provide edge-computing implementations, the 5GC 140 may select a UPF 148 close to the UE 102 and execute traffic steering from the UPF 148 to data network 136 via the N6 interface. This may be based on the UE subscription data, UE location, and information provided by the AF 160. In this way, the AF 160 may influence UPF (re)selection and traffic routing. Based on operator deployment, when AF 160 is considered to be a trusted entity, the network operator may permit AF 160 to interact directly with relevant NFs. Additionally, the AF 160 may exhibit an Naf service-based interface.

The data network 136 may represent various network operator services, Internet access, or third party services that may be provided by one or more servers including, for example, application/content server 138.

FIG. 2 schematically illustrates a wireless network 200 in accordance with various embodiments. The wireless network 200 may include a UE 202 in wireless communication with an AN 204. The UE 202 and AN 204 may be similar to, and substantially interchangeable with, like-named components described elsewhere herein.

The UE 202 may be communicatively coupled with the AN 204 via connection 206. The connection 206 is illustrated as an air interface to enable communicative coupling, and can be consistent with cellular communications protocols such as an LTE protocol or a 5G NR protocol operating at mmWave or sub-6 GHz frequencies.

The UE 202 may include a host platform 208 coupled with a modem platform 210. The host platform 208 may include application processing circuitry 212, which may be coupled with protocol processing circuitry 214 of the modem platform 210. The application processing circuitry 212 may run various applications for the UE 202 that source/sink application data. The application processing circuitry 212 may further implement one or more layer operations to transmit/receive application data to/from a data network. These layer operations may include transport (for example UDP) and Internet (for example, IP) operations The protocol processing circuitry 214 may implement one or more of layer operations to facilitate transmission or reception of data over the connection 206. The layer operations implemented by the protocol processing circuitry 214 may include, for example, MAC, RLC, PDCP, RRC and NAS operations.

The modem platform 210 may further include digital baseband circuitry 216 that may implement one or more layer operations that are "below" layer operations performed by the protocol processing circuitry 214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 210 may further include transmit circuitry 218, receive circuitry 220, RF circuitry 222, and RF front end (RFFE) 224, which may include or connect to one or more antenna panels 226. Briefly, the transmit circuitry 218 may include a digital-to-analog converter, mixer, intermediate frequency (IF) components, etc.; the receive circuitry 220 may include an analog-to-digital converter, mixer, IF components, etc.; the RF circuitry 222 may include a low-noise amplifier, a power amplifier, power tracking components, etc.; RFFE 224 may include filters (for example, surface/bulk acoustic wave filters), switches, antenna tuners, beamforming components (for example, phase-array antenna components), etc. The selection and arrangement of the components of the transmit circuitry 218, receive circuitry 220, RF circuitry 222, RFFE 224, and antenna panels 226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 214 may include one or more instances of control circuitry (not shown) to provide control functions for the transmit/receive components.

A UE reception may be established by and via the antenna panels 226, RFFE 224, RF circuitry 222, receive circuitry 220, digital baseband circuitry 216, and protocol processing circuitry 214. In some embodiments, the antenna panels 226 may receive a transmission from the AN 204 by receive-beamforming signals received by a plurality of antennas/antenna elements of the one or more antenna panels 226.

A UE transmission may be established by and via the protocol processing circuitry 214, digital baseband circuitry 216, transmit circuitry 218, RF circuitry 222, RFFE 224, and antenna panels 226. In some embodiments, the transmit components of the UE 204 may apply a spatial filter to the data to be transmitted to form a transmit beam emitted by the antenna elements of the antenna panels 226.

Similar to the UE 202, the AN 204 may include a host platform 228 coupled with a modem platform 230. The host platform 228 may include application processing circuitry 232 coupled with protocol processing circuitry 234 of the modem platform 230. The modem platform may further include digital baseband circuitry 236, transmit circuitry 238, receive circuitry 240, RF circuitry 242, RFFE circuitry 244, and antenna panels 246. The components of the AN 204 may be similar to and substantially interchangeable with like-named components of the UE 202. In addition to performing data transmission/reception as described above, the components of the AN 208 may perform various logical functions that include, for example, RNC functions such as radio bearer management, uplink and downlink dynamic radio resource management, and data packet scheduling.

FIG. 3 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 3 shows a diagrammatic representation of hardware resources 300 including one or more processors (or processor cores) 310, one or more memory/storage devices 320, and one or more communication resources 330, each of which may be communicatively coupled via a bus 340 or other interface circuitry. For embodiments where node virtualization (e.g., NFV) is utilized, a hypervisor 302 may be executed to provide an execution environment for one or more network slices/sub-slices to utilize the hardware resources 300.

The processors 310 may include, for example, a processor 312 and a processor 314. The processors 310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 320 may include main memory, disk storage, or any suitable combination thereof. The memory/storage devices 320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 330 may include interconnection or network interface controllers, components, or other suitable devices to communicate with one or more peripheral devices 304 or one or more databases 306 or other network elements via a network 308. For example, the communication resources 330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 350 may comprise software, a program, an application, an applet, an app, or other executable code for causing at least any of the processors 310 to perform any one or more of the methodologies discussed herein. The instructions 350 may reside, completely or partially, within at least one of the processors 310 (e.g., within the processor's cache memory), the memory/storage devices 320, or any suitable combination thereof. Furthermore, any portion of the instructions 350 may be transferred to the hardware resources 300 from any combination of the peripheral devices 304 or the databases 306. Accordingly, the memory of processors 310, the memory/storage devices 320, the peripheral devices 304, and the databases 306 are examples of computer-readable and machine-readable media.

Example Procedures

In some embodiments, the electronic device(s), network(s), system(s), chip(s) or component(s), or portions or implementations thereof, of FIGS. 1-3, or some other figure herein, may be configured to perform one or more processes, techniques, or methods as described herein, or portions thereof.

For example, FIG. 4 illustrates an example process 400 in accordance with various embodiments. The process 400 may be performed by a UE or a portion thereof. At 402, the process 400 may include identifying a positioning reference signal (PRS) measurement period based on a timing interval of:

$$T_{effect,i} = \left\lceil \frac{T_i}{T_{PRS,i}} \right\rceil * T_{PRS,i},$$

wherein i is a positioning frequency layer index, $T_{effect,i}$ is a periodicity of an effective PRS measurement in a positioning frequency layer i, $T_i$ corresponds to a duration of PRS processing symbols in every T milliseconds, and $T_{PRS,i}$ is a periodicity of a downlink PRS resource with muting on positioning frequency layer i. At 404, the process may further include performing one or more PRS measurements within the PRS measurement period.

FIG. 5 illustrates another example process 500 in accordance with various embodiments. The process 500 may be performed by a gNB or a portion thereof. At 502, the process 500 may include encoding, for transmission to a user equipment (UE), an indication of a periodicity of a downlink positioning reference signal (PRS) resource on a positioning frequency layer i, wherein a PRS measurement period is based on a timing interval of:

$$T_{effect,i} = \left\lceil \frac{T_i}{T_{PRS,i}} \right\rceil * T_{PRS,i},$$

wherein $T_{effect,i}$ is a periodicity of an effective PRS measurement in a positioning frequency layer i, $T_i$ corresponds to a duration of PRS processing symbols in every T milliseconds, and $T_{PRS,i}$ is the periodicity of the downlink PRS resource on the positioning frequency layer i. At 504, the process 500 may further include receiving, from the UE, one or more PRS measurements in accordance with the PRS measurement period.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example A1 may include one or more non-transitory computer-readable media (NTCRM) having instructions, stored thereon, that when executed by one or more processors of a user equipment (UE) configure the UE to: identify a positioning reference signal (PRS) measurement period based on a timing interval of:

$$T_{effect,i} = \left\lceil \frac{T_i}{T_{PRS,i}} \right\rceil * T_{PRS,i},$$

wherein i is a positioning frequency layer index, $T_{effect,i}$ is a periodicity of a PRS measurement in a positioning frequency layer i, $T_i$ corresponds to a duration of PRS processing symbols in every T milliseconds, and $T_{PRS,i}$ is a periodicity of a downlink PRS resource with muting on positioning frequency layer i; and perform one or more PRS measurements within the PRS measurement period.

Example A2 may include the one or more NTCRM of example A1, wherein the PRS measurement period is for a single positioning frequency layer.

Example A3 may include the one or more NTCRM of example A1, wherein the instructions, when executed, are further to configure the UE to perform one or more intra-frequency measurements for a positioning frequency layer which is included in an active bandwidth part of the UE.

Example A4 may include the one or more NTCRM of example A1, wherein the instructions, when executed, are further to configure the UE to perform a PRS measurement on one or more other positioning frequency layers via an inter-frequency measurement without a gap.

Example A5 may include the one or more NTCRM of example A1, wherein the instructions, when executed, are further to configure the UE to decode a broadcast message to determine a value of $T_{PRS,i}$.

Example A6 may include the one or more NTCRM of example A1, wherein the one or more PRS measurements are performed without a measurement gap.

Example A7 may include the one or more NTCRM of example A1, wherein the instructions, when executed, are further to configure the UE to: decode a message that activates a measurement gap for the one or more PRS measurements; and use the measurement gap upon expiration of an activation delay time.

Example A8 may include one or more non-transitory computer-readable media (NTCRM) having instructions, stored thereon, that when executed by one or more processors of a next generation Node B (gNB) configure the gNB to: encode, for transmission to a user equipment (UE), an indication of a periodicity of a downlink positioning reference signal (PRS) resource on a positioning frequency layer i, wherein a PRS measurement period is based on a timing interval of:

$$T_{effect,i} = \left\lceil \frac{T_i}{T_{PRS,i}} \right\rceil * T_{PRS,i},$$

wherein $T_{effect,i}$ is a periodicity of a PRS measurement in a positioning frequency layer i, $T_i$ corresponds to a duration of PRS processing symbols in every T milliseconds, and $T_{PRS,i}$ is the periodicity of the downlink PRS resource on the positioning frequency layer i; and receive, from the UE, one or more PRS measurements in accordance with the PRS measurement period.

Example A9 may include the one or more NTCRM of example A8, wherein the PRS measurement period is for a single positioning frequency layer.

Example A10 may include the one or more NTCRM of example A8, wherein the instructions, when executed, are further to configure the gNB to receive, from the UE, one or more intra-frequency measurements for a positioning frequency layer which is included in an active bandwidth part of the UE.

Example A11 may include the one or more NTCRM of example A8, wherein the instructions, when executed, are further to configure the gNB to receive, from the UE, a PRS measurement on one or more other positioning frequency layers via an inter-frequency measurement.

Example A12 may include the one or more NTCRM of example A8, wherein the indication of the periodicity of the downlink PRS message is transmitted via broadcast message to a plurality of UEs.

Example A13 may include the one or more NTCRM of example A8, wherein the one or more PRS measurements are performed without a measurement gap.

Example A14 may include the one or more NTCRM of example A8, wherein the instructions, when executed, are further to configure the gNB to: encode, for transmission to the UE, a message that activates a measurement gap for the one or more PRS measurements, wherein the UE is to use the measurement gap upon expiration of an activation delay time.

Example A15 may include an apparatus to be implemented in a user equipment (UE), the apparatus comprising: a memory to store a value, $T_{PRS,i}$, of a periodicity of a downlink positioning reference signal (PRS) resource on a positioning frequency layer i; and processor circuitry coupled to the memory. The processor circuitry is to: identify a positioning reference signal (PRS) measurement period based on a timing interval of:

$$T_{\textit{effect},i} = \left\lceil \frac{T_i}{T_{PRS,i}} \right\rceil * T_{PRS,i},$$

wherein i is a positioning frequency layer index, $T_{\textit{effect},i}$ is an effective periodicity of a PRS measurement in a positioning frequency layer i, $T_i$ corresponds to a duration of PRS processing symbols in every T milliseconds, and $T_{PRS,i}$ is a periodicity of a downlink PRS resource with muting on positioning frequency layer i; and perform one or more PRS measurements within the PRS measurement period.

Example A16 may include the apparatus of example A15, wherein the PRS measurement period is for a single positioning frequency layer.

Example A17 may include the apparatus of example A15, wherein the processor circuitry is further to perform one or more intra-frequency measurements for a positioning frequency layer which is included in an active bandwidth part of the UE.

Example A18 may include the apparatus of example A15, wherein the processor circuitry is further to perform a PRS measurement on one or more other positioning frequency layers via an inter-frequency measurement without a gap.

Example A19 may include the apparatus of example A15, wherein the one or more PRS measurements are performed without a measurement gap.

Example A20 may include the apparatus of example A15, wherein the processor circuitry is further to: decode a message that activates a measurement gap for the one or more PRS measurements; and use the measurement gap upon expiration of an activation delay time.

Example B1 may include a method to define the requirements for UE positioning measurements without gap.

Example B2 may include the method of example B1 or some other example herein, wherein the basic timing interval to be used to define PRS measurement period can be:

$$T_{\textit{effect},i} = \left\lceil \frac{T_i}{T_{PRS,i}} \right\rceil * T_{PRS,i}$$

Example B3 may include the method of example B1 or some other example herein, wherein the requirements are applicable for the single positioning frequency layer (PFL) measurements.

Example B4 may include the method of example B1 or some other example herein, where when multiple PFLs configured, UE can decide perform the intra-f measurement for the PFL which are contained within UE's active BWP. And other PFLs by inter-f measurement.

Example B5 may include the method to define the requirements for UE positioning measurements with pre-configured gap.

Example B6 may include the method of example B5 or some other example herein, wherein the requirements on pre-configured MG based measurement can include the pre-configured MG activation delay Example B7 may include the method of example B5 or some other example herein, wherein the requirements on pre-configured MG based measurement can include the pre-configured MG activation/deactivation transition time.

Example B8 may include a method of a UE, the method comprising:
determining a positioning reference signal (PRS) measurement period based on a timing interval of:

$$T_{\textit{effect},i} = \left\lceil \frac{T_i}{T_{PRS,i}} \right\rceil * T_{PRS,i};$$

performing one or more PRS measurements in the PRS measurement period.

Example B9 may include the method of example B8 or some other example herein, wherein the PRS measurement period is for a single positioning frequency layer (PFL).

Example B10 may include the method of example B8-B9 or some other example herein, further comprising determining to perform one or more intra-frequency measurements for a PFL which included in an active BWP of the UE, and/or performing PRS measurements on one or more other. PFLs by inter-frequency measurement.

Example Z01 may include an apparatus comprising means to perform one or more elements of a method described in or related to any of examples A1-A20, B1-B10, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A20, B1-B10, or any other method or process described herein.

Example Z03 may include an apparatus comprising logic, modules, or circuitry to perform one or more elements of a method described in or related to any of examples A1-A20, B1-B10, or any other method or process described herein.

Example Z04 may include a method, technique, or process as described in or related to any of examples A1-A20, B1-B10, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A20, B1-B10, or portions thereof.

Example Z06 may include a signal as described in or related to any of examples A1-A20, B1-B10, or portions or parts thereof.

Example Z07 may include a datagram, packet, frame, segment, protocol data unit (PDU), or message as described in or related to any of examples A1-A20, B1-B10, or portions or parts thereof, or otherwise described in the present disclosure.

Example Z08 may include a signal encoded with data as described in or related to any of examples A1-A20, B1-B10, or portions or parts thereof, or otherwise described in the present disclosure.

Example Z09 may include a signal encoded with a datagram, packet, frame, segment, protocol data unit (PDU), or message as described in or related to any of examples A1-A20, B1-B10, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A20, B1-B10, or portions thereof.

Example Z11 may include a computer program comprising instructions, wherein execution of the program by a processing element is to cause the processing element to carry out the method, techniques, or process as described in or related to any of examples A1-A20, B1-B10, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

ABBREVIATIONS

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CApital EXpenditure |
| CBRA | Contention Based Random Access |
| CC | Component Carrier, Country Code, Cryptographic Checksum |
| CCA | Clear Channel Assessment |
| CCE | Control Channel Element |

| | | |
|---|---|---|
| CCCH | Common Control Channel | |
| CE | Coverage Enhancement | |
| CDM | Content Delivery Network | |
| CDMA | Code-Division Multiple Access | |
| CDR | Charging Data Request | |
| CDR | Charging Data Response | |
| CFRA | Contention Free Random Access | |
| CG | Cell Group | |
| CGF | Charging Gateway Function | |
| CHF | Charging Function | |
| CI | Cell Identity | |
| CID | Cell-ID (e.g., positioning method) | |
| CIM | Common Information Model | |
| CIR | Carrier to Interference Ratio | |
| CK | Cipher Key | |
| CM | Connection Management, Conditional Mandatory | |
| CMAS | Commercial Mobile Alert Service | |
| CMD | Command | |
| CMS | Cloud Management System | |
| CO | Conditional Optional | |
| CoMP | Coordinated Multi-Point | |
| CORESET | Control Resource Set | |
| COTS | Commercial Off-The-Shelf | |
| CP | Control Plane, Cyclic Prefix, Connection Point | |
| CPD | Connection Point Descriptor | |
| CPE | Customer Premise Equipment | |
| CPICH | Common Pilot Channel | |
| CQI | Channel Quality Indicator | |
| CPU | CSI processing unit, Central Processing Unit | |
| C/R | Command/Response field bit | |
| CRAN | Cloud Radio Access Network, Cloud RAN | |
| CRB | Common Resource Block | |
| CRC | Cyclic Redundancy Check | |
| CRI | Channel-State Information Resource Indicator, CSI-RS Resource Indicator | |
| C-RNTI | Cell RNTI | |
| CS | Circuit Switched | |
| CSCF | call session control function | |
| CSAR | Cloud Service Archive | |
| CSI | Channel-State Information | |
| CSI-IM | CSI Interference Measurement | |
| CSI-RS | CSI Reference Signal | |
| CSI-RSRP | CSI reference signal received power | |
| CSI-RSRQ | CSI reference signal received quality | |
| CSI-SINR | CSI signal-to-noise and interference ratio | |
| CSMA | Carrier Sense Multiple Access | |
| CSMA/CA | CSMA with collision avoidance | |
| CSS | Common Search Space, Cell-specific Search Space | |
| CTF | Charging Trigger Function | |
| CTS | Clear-to-Send | |
| CW | Codeword | |
| CWS | Contention Window Size | |
| D2D | Device-to-Device | |
| DC | Dual Connectivity, Direct Current | |
| DCI | Downlink Control Information | |
| DF | Deployment Flavour | |
| DL | Downlink | |
| DMTF | Distributed Management Task Force | |
| DPDK | Data Plane Development Kit | |
| DM-RS, DMRS | Demodulation Reference Signal | |
| DN | Data network | |
| DNN | Data Network Name | |
| DNAI | Data Network Access Identifier | |
| DRB | Data Radio Bearer | |
| DRS | Discovery Reference Signal | |
| DRX | Discontinuous Reception | |
| DSL | Domain Specific Language. Digital Subscriber Line | |
| DSLAM | DSL Access Multiplexer | |
| DwPTS | Downlink Pilot Time Slot | |
| E-LAN | Ethernet Local Area Network | |
| E2E | End-to-End | |
| EAS | Edge Application Server | |
| ECCA | extended clear channel assessment, extended CCA | |
| ECCE | Enhanced Control Channel Element, Enhanced CCE | |
| ED | Energy Detection | |
| EDGE | Enhanced Datarates for GSM Evolution (GSM Evolution) | |
| EAS | Edge Application Server | |
| EASID | Edge Application Server Identification | |
| ECS | Edge Configuration Server | |

| Abbr. | Definition |
|---|---|
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |

| | | |
|---|---|---|
| GUTI | Globally Unique Temporary UE Identity | |
| HARQ | Hybrid ARQ, Hybrid Automatic Repeat Request | |
| HANDO | Handover | |
| HFN | HyperFrame Number | |
| HHO | Hard Handover | |
| HLR | Home Location Register | |
| HN | Home Network | |
| HO | Handover | |
| HPLMN | Home Public Land Mobile Network | |
| HSDPA | High Speed Downlink Packet Access | |
| HSN | Hopping Sequence Number | |
| HSPA | High Speed Packet Access | |
| HSS | Home Subscriber Server | |
| HSUPA | High Speed Uplink Packet Access | |
| HTTP | Hyper Text Transfer Protocol | |
| HTTPS | Hyper Text Transfer Protocol Secure (https is http/1.1 over SSL, i.e. port 443) | |
| I-Block | Information Block | |
| ICCID | Integrated Circuit Card Identification | |
| IAB | Integrated Access and Backhaul | |
| ICIC | Inter-Cell Interference Coordination | |
| ID | Identity, identifier | |
| IDFT | Inverse Discrete Fourier Transform | |
| IE | Information element | |
| IBE | In-Band Emission | |
| IEEE | Institute of Electrical and Electronics Engineers | |
| IEI | Information Element Identifier | |
| IEIDL | Information Element Identifier Data Length | |
| IETF | Internet Engineering Task Force | |
| IF | Infrastructure | |
| IIOT | Industrial Internet of Things | |
| IM | Interference Measurement, Intermodulation, IP Multimedia | |
| IMC | IMS Credentials | |
| IMEI | International Mobile Equipment Identity | |
| IMGI | International mobile group identity | |
| IMPI | IP Multimedia Private Identity | |
| IMPU | IP Multimedia PUblic identity | |
| IMS | IP Multimedia Subsystem | |
| IMSI | International Mobile Subscriber Identity | |
| IoT | Internet of Things | |
| IP | Internet Protocol | |
| Ipsec | IP Security, Internet Protocol Security | |
| IP-CAN | IP-Connectivity Access Network | |
| IP-M | IP Multicast | |
| IPv4 | Internet Protocol Version 4 | |
| IPv6 | Internet Protocol Version 6 | |
| IR | Infrared | |
| IS | In Sync | |
| IRP | Integration Reference Point | |
| ISDN | Integrated Services Digital Network | |
| ISIM | IM Services Identity Module | |
| ISO | International Organisation for Standardisation | |
| ISP | Internet Service Provider | |
| IWF | Interworking-Function | |
| I-WLAN | Interworking WLAN | |
| | Constraint length of the convolutional code, USIM Individual key | |
| kB | Kilobyte (1000 bytes) | |
| kbps | kilo-bits per second | |
| Kc | Ciphering key | |
| Ki | Individual subscriber authentication key | |
| KPI | Key Performance Indicator | |
| KQI | Key Quality Indicator | |
| KSI | Key Set Identifier | |
| ksps | kilo-symbols per second | |
| KVM | Kernel Virtual Machine | |
| L1 | Layer 1 (physical layer) | |
| L1-RSRP | Layer 1 reference signal received power | |
| L2 | Layer 2 (data link layer) | |
| L3 | Layer 3 (network layer) | |
| LAA | Licensed Assisted Access | |
| LAN | Local Area Network | |
| LADN | Local Area Data Network | |
| LBT | Listen Before Talk | |
| LCM | LifeCycle Management | |
| LCR | Low Chip Rate | |
| LCS | Location Services | |
| LCID | Logical Channel ID | |
| LI | Layer Indicator | |
| LLC | Logical Link Control, Low Layer Compatibility | |
| LMF | Location Management Function | |
| LOS | Line of Sight | |
| LPLMN | Local PLMN | |
| LPP | LTE Positioning Protocol | |

| | | |
|---|---|---|
| LSB | Least Significant Bit | |
| LTE | Long Term Evolution | |
| LWA | LTE-WLAN aggregation | |
| LWIP | LTE/WLAN Radio Level Integration with IPsec Tunnel | |
| LTE | Long Term Evolution | |
| M2M | Machine-to-Machine | |
| MAC | Medium Access Control (protocol layering context) | |
| MAC | Message authentication code (security/encryption context) | |
| MAC-A | MAC used for authentication and key agreement (TSG T WG3 context) | |
| MAC-IMAC | used for data integrity of signalling messages (TSG T WG3 context) | |
| MANO | Management and Orchestration | |
| MBMS | Multimedia Broadcast and Multicast Service | |
| MBSFN | Multimedia Broadcast multicast service Single Frequency Network | |
| MCC | Mobile Country Code | |
| MCG | Master Cell Group | |
| MCOT | Maximum Channel Occupancy Time | |
| MCS | Modulation and coding scheme | |
| MDAF | Management Data Analytics Function | |
| MDAS | Management Data Analytics Service | |
| MDT | Minimization of Drive Tests | |
| ME | Mobile Equipment | |
| MeNB | master eNB | |
| MER | Message Error Ratio | |
| MGL | Measurement Gap Length | |
| MGRP | Measurement Gap Repetition Period | |
| MIB | Master Information Block, Management Information Base | |
| MIMO | Multiple Input Multiple Output | |
| MLC | Mobile Location Centre | |
| MM | Mobility Management | |
| MME | Mobility Management Entity | |
| MN | Master Node | |
| MNO | Mobile Network Operator | |
| MO | Measurement Object, Mobile Originated | |
| MPBCH | MTC Physical Broadcast CHannel | |
| MPDCCH | MTC Physical Downlink Control CHannel | |
| MPDSCH | MTC Physical Downlink Shared CHannel | |
| MPRACH | MTC Physical Random Access CHannel | |
| MPUSCH | MTC Physical Uplink Shared Channel | |
| MPLS | MultiProtocol Label Switching | |
| MS | Mobile Station | |
| MSB | Most Significant Bit | |
| MSC | Mobile Switching Centre | |
| MSI | Minimum System Information, MCH Scheduling Information | |
| MSID | Mobile Station Identifier | |
| MSIN | Mobile Station Identification Number | |
| MSISDN | Mobile Subscriber ISDN Number | |
| MT | Mobile Terminated, Mobile Termination | |
| MTC | Machine-Type Communications | |
| mMTC | massive MTC, massive Machine-Type Communications | |
| MU-MIMO | Multi User MIMO | |
| MWUS | MTC wake-up signal, MTC WUS | |
| NACK | Negative Acknowledgement | |
| NAI | Network Access Identifier | |
| NAS | Non-Access Stratum, Non-Access Stratum layer | |
| NCT | Network Connectivity Topology | |
| NC-JT | Non-coherent Joint Transmission | |
| NEC | Network Capability Exposure | |
| NE-DC | NR-E-UTRA Dual Connectivity | |
| NEF | Network Exposure Function | |
| NF | Network Function | |
| NFP | Network Forwarding Path | |
| NFPD | Network Forwarding Path Descriptor | |
| NFV | Network Functions Virtualization | |
| NFVI | NFV Infrastructure | |
| NFVO | NFV Orchestrator | |
| NG | Next Generation, Next Gen | |
| NGEN-DC | NG-RAN E-UTRA-NR Dual Connectivity | |
| NM | Network Manager | |
| NMS | Network Management System | |
| N-PoP | Network Point of Presence | |
| NMIB, | N-MIB Narrowband MIB | |

| | | |
|---|---|---|
| NPBCH | Narrowband Physical Broadcast CHannel | |
| NPDCCH | Narrowband Physical Downlink Control CHannel | |
| NPDSCH | Narrowband Physical Downlink Shared CHannel | |
| NPRACH | Narrowband Physical Random Access CHannel | |
| NPUSCH | Narrowband Physical Uplink Shared CHannel | |
| NPSS | Narrowband Primary Synchronization Signal | |
| NSSS | Narrowband Secondary Synchronization Signal | |
| NR | New Radio, Neighbour Relation | |
| NRF | NF Repository Function | |
| NRS | Narrowband Reference Signal | |
| NS | Network Service | |
| NSA | Non-Standalone operation mode | |
| NSD | Network Service Descriptor | |
| NSR | Network Service Record | |
| NSSAI | Network Slice Selection Assistance Information | |
| S-NNSAI | Single-NSSAI | |
| NSSF | Network Slice Selection Function | |
| NW | Network | |
| NWUS | Narrowband wake-up signal, Narrowband WUS | |
| NZP | Non-Zero Power | |
| O&M | Operation and Maintenance | |
| ODU2 | Optical channel Data Unit-type 2 | |
| OFDM | Orthogonal Frequency Division Multiplexing | |
| OFDMA | Orthogonal Frequency Division Multiple Access | |
| OOB | Out-of-band | |
| OOS | Out of Sync | |
| OPEX | OPerating EXpense | |
| OSI | Other System Information | |
| OSS | Operations Support System | |
| OTA | over-the-air | |
| PAPR | Peak-to-Average Power Ratio | |
| PAR | Peak to Average Ratio | |
| PBCH | Physical Broadcast Channel | |
| PC | Power Control, Personal Computer | |
| PCC | Primary Component Carrier, Primary CC | |
| P-CSCF | Proxy CSCF | |
| PCell | Primary Cell | |
| PCI | Physical Cell ID, Physical Cell Identity | |
| PCEF | Policy and Charging Enforcement Function | |
| PCF | Policy Control Function | |
| PCRF | Policy Control and Charging Rules Function | |
| PDCP | Packet Data Convergence Protocol, Packet Data Convergence Protocol layer | |
| PDCCH | Physical Downlink Control Channel | |
| PDCP | Packet Data Convergence Protocol | |
| PDN | Packet Data Network, Public Data Network | |
| PDSCH | Physical Downlink Shared Channel | |
| PDU | Protocol Data Unit | |
| PEI | Permanent Equipment Identifiers | |
| PFD | Packet Flow Description | |
| P-GW | PDN Gateway | |
| PHICH | Physical hybrid-ARQ indicator channel | |
| PHY | Physical layer | |
| PLMN | Public Land Mobile Network | |
| PIN | Personal Identification Number | |
| PM | Performance Measurement | |
| PMI | Precoding Matrix Indicator | |
| PNF | Physical Network Function | |
| PNFD | Physical Network Function Descriptor | |
| PNFR | Physical Network Function Record | |
| POC | PTT over Cellular | |
| PP, PTP | Point-to-Point | |
| PPP | Point-to-Point Protocol | |
| PRACH | Physical RACH | |
| PRB | Physical resource block | |
| PRG | Physical resource block group | |
| ProSe | Proximity Services, Proximity-Based Service | |
| PRS | Positioning Reference Signal | |
| PRR | Packet Reception Radio | |
| PS | Packet Services | |
| PSBCH | Physical Sidelink Broadcast Channel | |
| PSDCH | Physical Sidelink Downlink Channel | |
| PSCCH | Physical Sidelink Control Channel | |

| | | |
|---|---|---|
| PSSCH | Physical Sidelink Shared Channel | |
| PSCell | Primary SCell | |
| PSS | Primary Synchronization Signal | |
| PSTN | Public Switched Telephone Network | |
| PT-RS | Phase-tracking reference signal | |
| PTT | Push-to-Talk | |
| PUCCH | Physical Uplink Control Channel | |
| PUSCH | Physical Uplink Shared Channel | |
| QAM | Quadrature Amplitude Modulation | |
| QCI | QoS class of identifier | |
| QCL | Quasi co-location | |
| QFI | QoS Flow ID, QoS Flow Identifier | |
| QoS | Quality of Service | |
| QPSK | Quadrature (Quaternary) Phase Shift Keying | |
| QZSS | Quasi-Zenith Satellite System | |
| RA-RNTI | Random Access RNTI | |
| RAB | Radio Access Bearer, Random Access Burst | |
| RACH | Random Access Channel | |
| RADIUS | Remote Authentication Dial In User Service | |
| RAN | Radio Access Network | |
| RAND | RANDom number (used for authentication) | |
| RAR | Random Access Response | |
| RAT | Radio Access Technology | |
| RAU | Routing Area Update | |
| RB | Resource block, Radio Bearer | |
| RBG | Resource block group | |
| REG | Resource Element Group | |
| Rel | Release | |
| REQ | REQuest | |
| RF | Radio Frequency | |
| RI | Rank Indicator | |
| RIV | Resource indicator value | |
| RL | Radio Link | |
| RLC | Radio Link Control, Radio Link Control layer | |
| RLC AM | RLC Acknowledged Mode | |
| RLC UM | RLC Unacknowledged Mode | |
| RLF | Radio Link Failure | |
| RLM | Radio Link Monitoring | |
| RLM-RS | Reference Signal for RLM | |
| RM | Registration Management | |
| RMC | Reference Measurement Channel | |
| RMSI | Remaining MSI, Remaining Minimum System Information | |
| RN | Relay Node | |
| RNC | Radio Network Controller | |
| RNL | Radio Network Layer | |
| RNTI | Radio Network Temporary Identifier | |
| ROHC | RObust Header Compression | |
| RRC | Radio Resource Control, Radio Resource Control layer | |
| RRM | Radio Resource Management | |
| RS | Reference Signal | |
| RSRP | Reference Signal Received Power | |
| RSRQ | Reference Signal Received Quality | |
| RSSI | Received Signal Strength Indicator | |
| RSU | Road Side Unit | |
| RSTD | Reference Signal Time difference | |
| RTP | Real Time Protocol | |
| RTS | Ready-To-Send | |
| RTT | Round Trip Time | |
| Rx | Reception, Receiving, Receiver | |
| S1AP | S1 Application Protocol | |
| S1-MME | S1 for the control plane | |
| S1-U | S1 for the user plane | |
| S-CSCF | serving CSCF | |
| S-GW | Serving Gateway | |
| S-RNTI | SRNC Radio Network Temporary Identity | |
| S-TMSI | SAE Temporary Mobile Station Identifier | |
| SA | Standalone operation mode | |
| SAE | System Architecture Evolution | |
| SAP | Service Access Point | |
| SAPD | Service Access Point Descriptor | |
| SAPI | Service Access Point Identifier | |
| SCC | Secondary Component Carrier, Secondary CC | |
| SCell | Secondary Cell | |
| SCEF | Service Capability Exposure Function | |
| SC-FDMA | Single Carrier Frequency Division Multiple Access | |
| SCG | Secondary Cell Group | |
| SCM | Security Context Management | |
| SCS | Subcarrier Spacing | |
| SCTP | Stream Control Transmission Protocol | |

| | | |
|---|---|---|
| SDAP | Service Data Adaptation Protocol, Service Data Adaptation Protocol layer | |
| SDL | Supplementary Downlink | |
| SDNF | Structured Data Storage Network Function | |
| SDP | Session Description Protocol | |
| SDSF | Structured Data Storage Function | |
| SDT | Small Data Transmission | |
| SDU | Service Data Unit | |
| SEAF | Security Anchor Function | |
| SeNB | secondary eNB | |
| SEPP | Security Edge Protection Proxy | |
| SFI | Slot format indication | |
| SFTD | Space-Frequency Time Diversity, SFN and frame timing difference | |
| SFN | System Frame Number | |
| SgNB | Secondary gNB | |
| SGSN | Serving GPRS Support Node | |
| S-GW | Serving Gateway | |
| SI | System Information | |
| SI-RNTI | System Information RNTI | |
| SIB | System Information Block | |
| SIM | Subscriber Identity Module | |
| SIP | Session Initiated Protocol | |
| SiP | System in Package | |
| SL | Sidelink | |
| SLA | Service Level Agreement | |
| SM | Session Management | |
| SMF | Session Management Function | |
| SMS | Short Message Service | |
| SMSF | SMS Function | |
| SMTC | SSB-based Measurement Timing Configuration | |
| SN | Secondary Node, Sequence Number | |
| SoC | System on Chip | |
| SON | Self-Organizing Network | |
| SpCell | Special Cell | |
| SP-CSI-RNTI | Semi-Persistent CSI RNTI | |
| SPS | Semi-Persistent Scheduling | |
| SQN | Sequence number | |
| SR | Scheduling Request | |
| SRB | Signalling Radio Bearer | |
| SRS | Sounding Reference Signal | |
| SS | Synchronization Signal | |
| SSB | Synchronization Signal Block | |
| SSID | Service Set Identifier | |
| SS/PBCH | Block | |
| SSBRI | SS/PBCH Block Resource Indicator, Synchronization Signal Block Resource Indicator | |
| SSC | Session and Service Continuity | |
| SS-RSRP | Synchronization Signal based Reference Signal Received Power | |
| SS-RSRQ | Synchronization Signal based Reference Signal Received Quality | |
| SS-SINR | Synchronization Signal based Signal to Noise and Interference Ratio | |
| SSS | Secondary Synchronization Signal | |
| SSSG | Search Space Set Group | |
| SSSIF | Search Space Set Indicator | |
| SST | Slice/Service Types | |
| SU-MIMO | Single User MIMO | |
| SUL | Supplementary Uplink | |
| TA | Timing Advance, Tracking Area | |
| TAC | Tracking Area Code | |
| TAG | Timing Advance Group | |
| TAI | Tracking Area Identity | |
| TAU | Tracking Area Update | |
| TB | Transport Block | |
| TBS | Transport Block Size | |
| TBD | To Be Defined | |
| TCI | Transmission Configuration Indicator | |
| TCP | Transmission Communication Protocol | |
| TDD | Time Division Duplex | |
| TDM | Time Division Multiplexing | |
| TDMA | Time Division Multiple Access | |
| TE | Terminal Equipment | |
| TEID | Tunnel End Point Identifier | |
| TFT | Traffic Flow Template | |
| TMSI | Temporary Mobile Subscriber Identity | |
| TNL | Transport Network Layer | |
| TPC | Transmit Power Control | |
| TPMI | Transmitted Precoding Matrix Indicator | |
| TR | Technical Report | |
| TRP, TRxP | Transmission Reception Point | |
| TRS | Tracking Reference Signal | |
| TRx | Transceiver | |
| TS | Technical Specifications, Technical Standard | |

| | |
|---|---|
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | EXpected user RESponse |
| XOR | exclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors of a user equipment (UE) configure the UE to:
   identify a positioning reference signal (PRS) measurement period based on a timing interval of:

$$T_{effect,i} = \left\lceil \frac{T_i}{T_{available\_PRS,i}} \right\rceil * T_{available\_PRS,i}$$

wherein i is a positioning frequency layer index, $T_{effect,i}$ is a periodicity of an effective PRS measurement in a positioning frequency layer i, $T_i$ corresponds to a duration of PRS processing symbols in every T milliseconds, $T_{available\_PRS,i}$ is a least common multiple between $T_{PRS,i}$ and a repetition periodicity of a PRS processing window for measurement in positioning frequency layer i, and $T_{PRS,i}$ is a periodicity of a downlink PRS resource with muting on positioning frequency layer i; and
   perform one or more PRS measurements within the PRS measurement period.

2. The one or more NTCRM of claim 1, wherein the PRS measurement period is for a single positioning frequency layer.

3. The one or more NTCRM of claim 1, wherein the instructions, when executed, are further to configure the UE to perform one or more intra-frequency measurements for a positioning frequency layer which is included in an active bandwidth part of the UE.

4. The one or more NTCRM of claim 1, wherein the instructions, when executed, are further to configure the UE to perform a PRS measurement on one or more other positioning frequency layers via an inter-frequency measurement without a gap.

5. The one or more NTCRM of claim 1, wherein the instructions, when executed, are further to configure the UE to decode a broadcast message to determine a value of $T_{PRS,i}$.

6. The one or more NTCRM of claim 1, wherein the one or more PRS measurements are performed without a measurement gap.

7. The one or more NTCRM of claim 1, wherein the instructions, when executed, are further to configure the UE to:
   decode a message that activates a measurement gap for the one or more PRS measurements; and
   use the measurement gap upon expiration of an activation delay time.

8. One or more non-transitory computer-readable media (NTCRM) having instructions, stored thereon, that when executed by one or more processors of a next generation Node B (gNB) configure the gNB to:
   encode, for transmission to a user equipment (UE), an indication of a periodicity of a downlink positioning reference signal (PRS) resource with muting on a positioning frequency layer i, wherein a PRS measurement period is based on a timing interval of:

$$T_{effect,i} = \left\lceil \frac{T_i}{T_{available\_PRS,i}} \right\rceil * T_{available\_PRS,i}$$

wherein $T_{effect,i}$ is a periodicity of a PRS measurement in a positioning frequency layer i, $T_i$ corresponds to a duration of PRS processing symbols in every T milliseconds, $T_{available\_PRS,i}$ is a least common multiple between $T_{PRS,i}$ and a repetition periodicity of a PRS processing window for measurement in positioning is a least common multiple between $T_{PRS,i}$ and a repetition periodicity of a PRS processing window for measurement in positioning frequency layer i, and $T_{PRS,i}$ the periodicity of the downlink PRS resource with muting on the positioning frequency layer i; and
   receive, from the UE, one or more PRS measurements in accordance with the PRS measurement period.

9. The one or more NTCRM of claim 8, wherein the PRS measurement period is for a single positioning frequency layer.

10. The one or more NTCRM of claim 8, wherein the instructions, when executed, are further to configure the gNB to receive, from the UE, one or more intra-frequency measurements for a positioning frequency layer which is included in an active bandwidth part of the UE.

11. The one or more NTCRM of claim 8, wherein the instructions, when executed, are further to configure the gNB to receive, from the UE, a PRS measurement on one or more other positioning frequency layers via an inter-frequency measurement.

12. The one or more NTCRM of claim 8, wherein the indication of the periodicity of the downlink PRS message is transmitted via broadcast message to a plurality of UEs.

13. The one or more NTCRM of claim 8, wherein the one or more PRS measurements are performed without a measurement gap.

14. The one or more NTCRM of claim 8, wherein the instructions, when executed, are further to configure the gNB to:
   encode, for transmission to the UE, a message that activates a measurement gap for the one or more PRS measurements, wherein the UE is to use the measurement gap upon expiration of an activation delay time.

15. An apparatus to be implemented in a user equipment (UE), the apparatus comprising:
   a memory to store a value, $T_{PRS,i}$, of a periodicity of a downlink positioning reference signal (PRS) resource with muting on a positioning frequency layer i; and
   processor circuitry coupled to the memory, the processor circuitry to:
     identify a positioning reference signal (PRS) measurement period based on a timing interval of:

$$T_{effect,i} = \left\lceil \frac{T_i}{T_{PRS,i}} \right\rceil * T_{PRS,i}$$

wherein i is a positioning frequency layer index, $T_{effect,i}$ is a periodicity of an effective PRS measurement in a positioning frequency layer i, $T_i$ corresponds to a duration of PRS processing symbols in every T milliseconds, and $T_{available\_PRS,i}$ is a least common multiple between $T_{PRS,i}$ and a repetition periodicity of a PRS processing window for measurement in positioning frequency layer i, and perform one or more PRS measurements in the PRS measurement period.

16. The apparatus of claim 15, wherein the PRS measurement period is for a single positioning frequency layer.

17. The apparatus of claim 15, wherein the processor circuitry is further to perform one or more intra-frequency measurements for a positioning frequency layer which is included in an active bandwidth part of the UE.

18. The apparatus of claim 15, wherein the processor circuitry is further to perform a PRS measurement on one or more other positioning frequency layers via an inter-frequency measurement without a gap.

19. The apparatus of claim 15, wherein the one or more PRS measurements are performed without a measurement gap.

20. The apparatus of claim 15, wherein the processor circuitry is further to:
- decode a message that activates a measurement gap for the one or more PRS measurements; and
- use the measurement gap upon expiration of an activation delay time.

* * * * *